Figure 1:
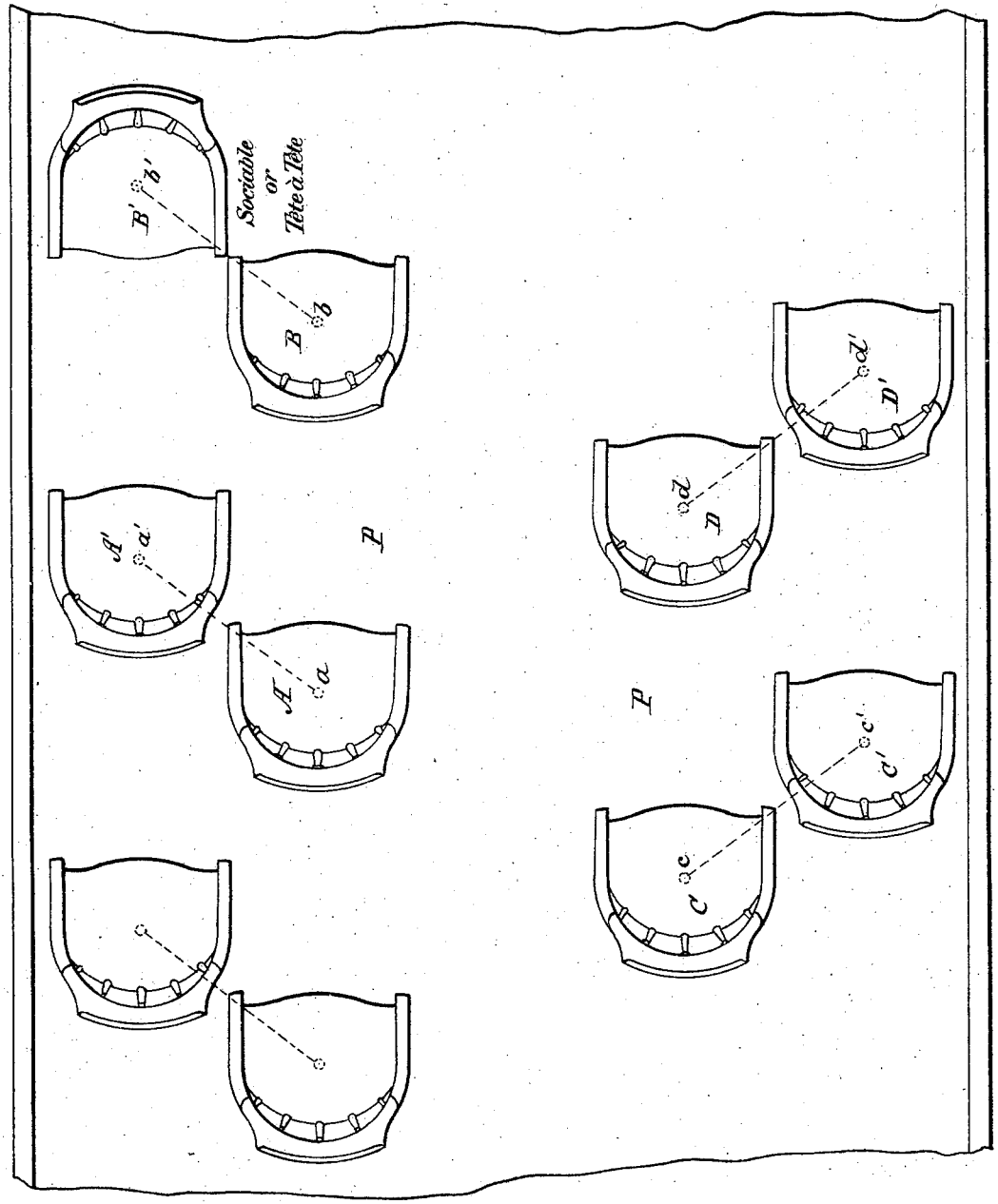

H. ALLEN.
Car-Seat and Couch.

No. 55,448.

6 Sheets—Sheet 1.

Patented June 12 1866.

Witnesses:
John Cantine
Albert Lucius

Inventor:
Horatio Allen

H. ALLEN.
Car-Seat and Couch.
No. 55,448.
6 Sheets—Sheet 2.
Patented June 12 1866.
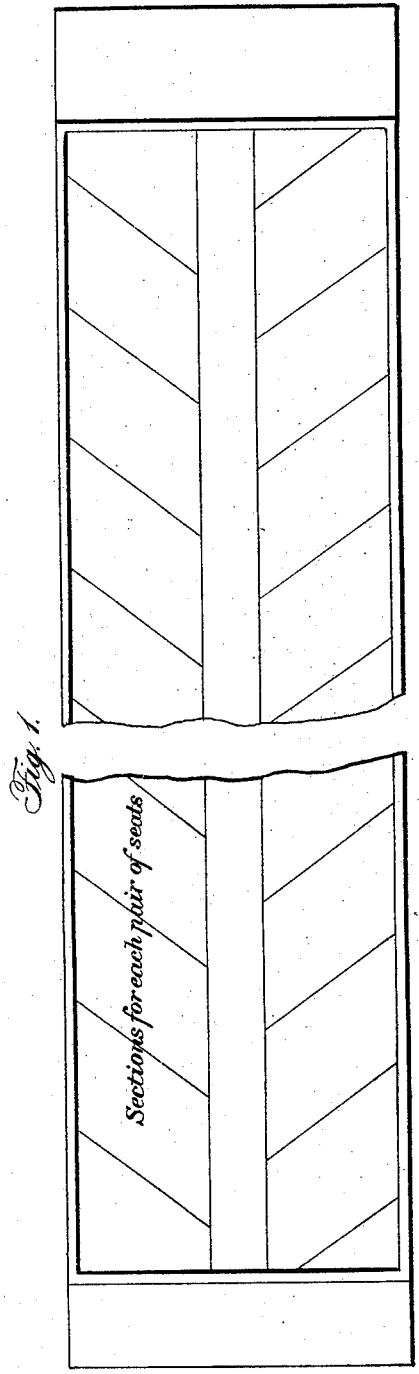
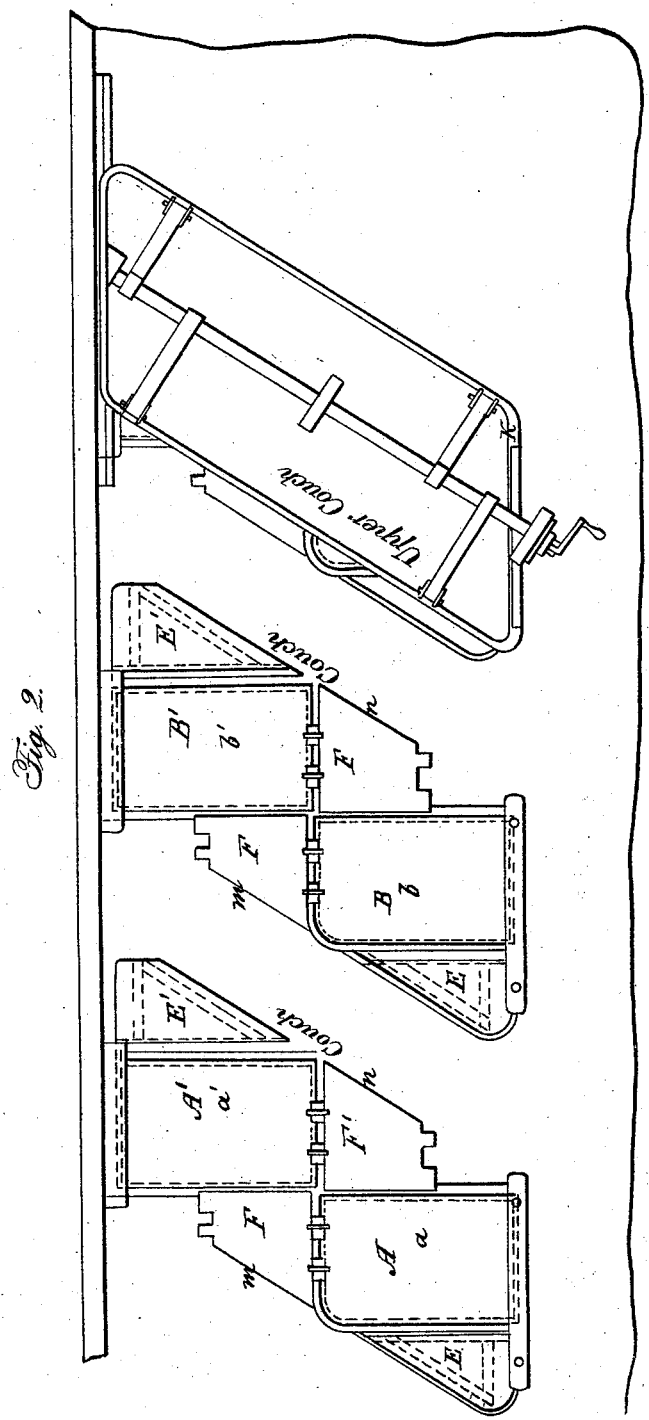
Witnesses:
John Canture
Albert Lucius
Inventor:
Horatio Allen

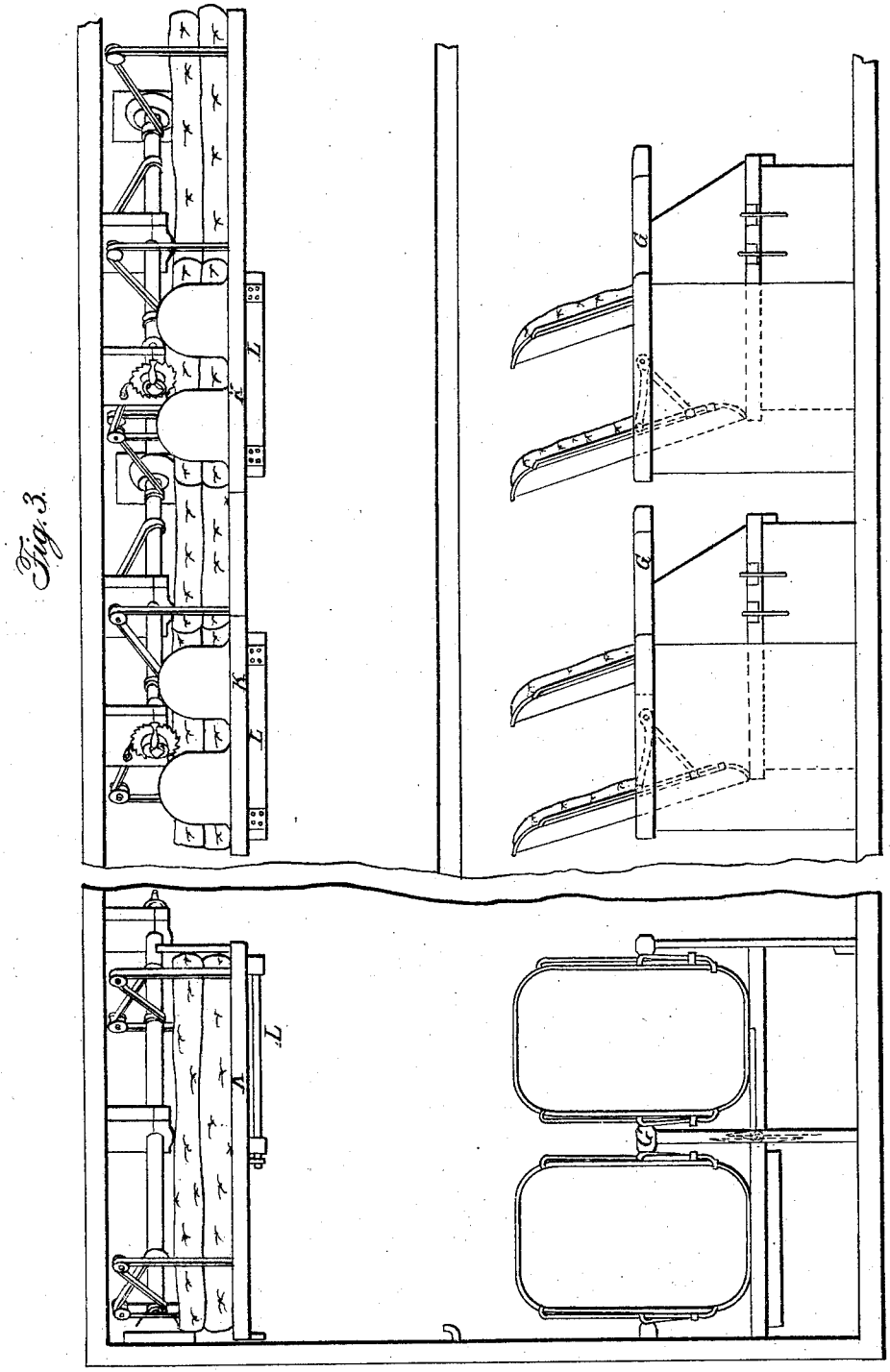

H. ALLEN.
Car-Seat and Couch.
No. 55,448.
6 Sheets—Sheet 4.
Patented June 12 1866.
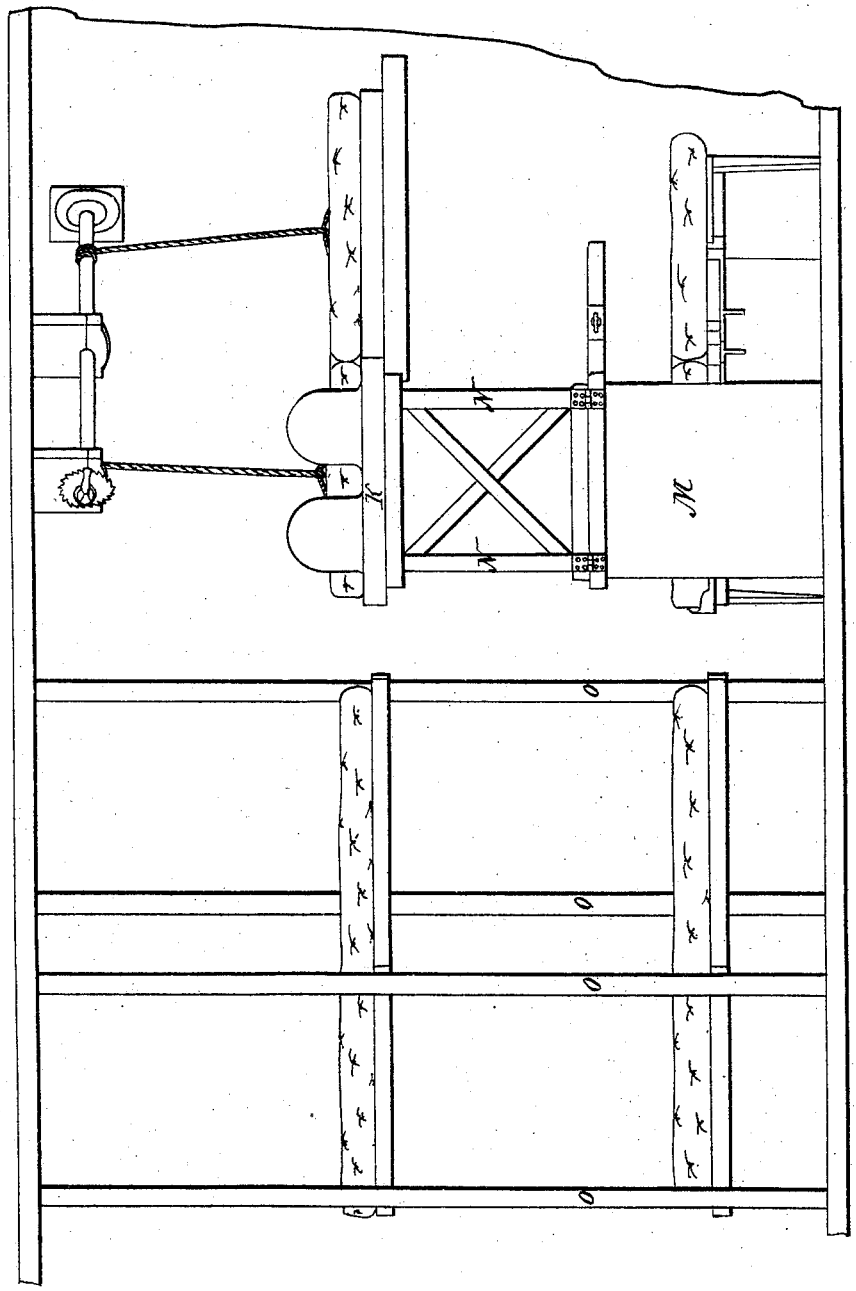
Witnesses:
John Cantine
Albert Lueius
Inventor:
Horatio Allen H. ALLEN.
Car-Seat and Couch.
No. 55,448.
6 Sheets—Sheet 5.
Patented June 12 1866.
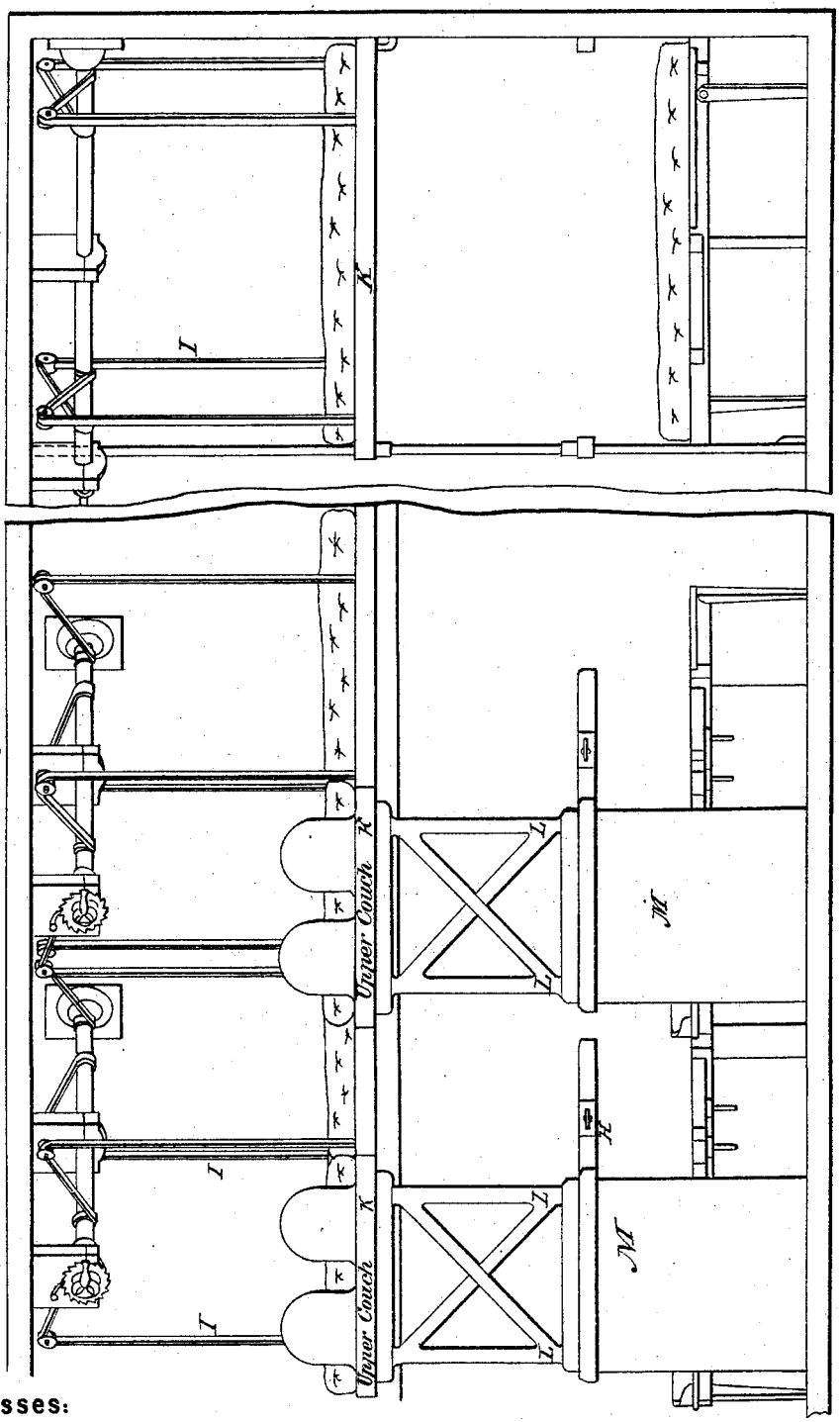
Witnesses:
John Cantine
Albert Lucius
Inventor:
Horatio Allen

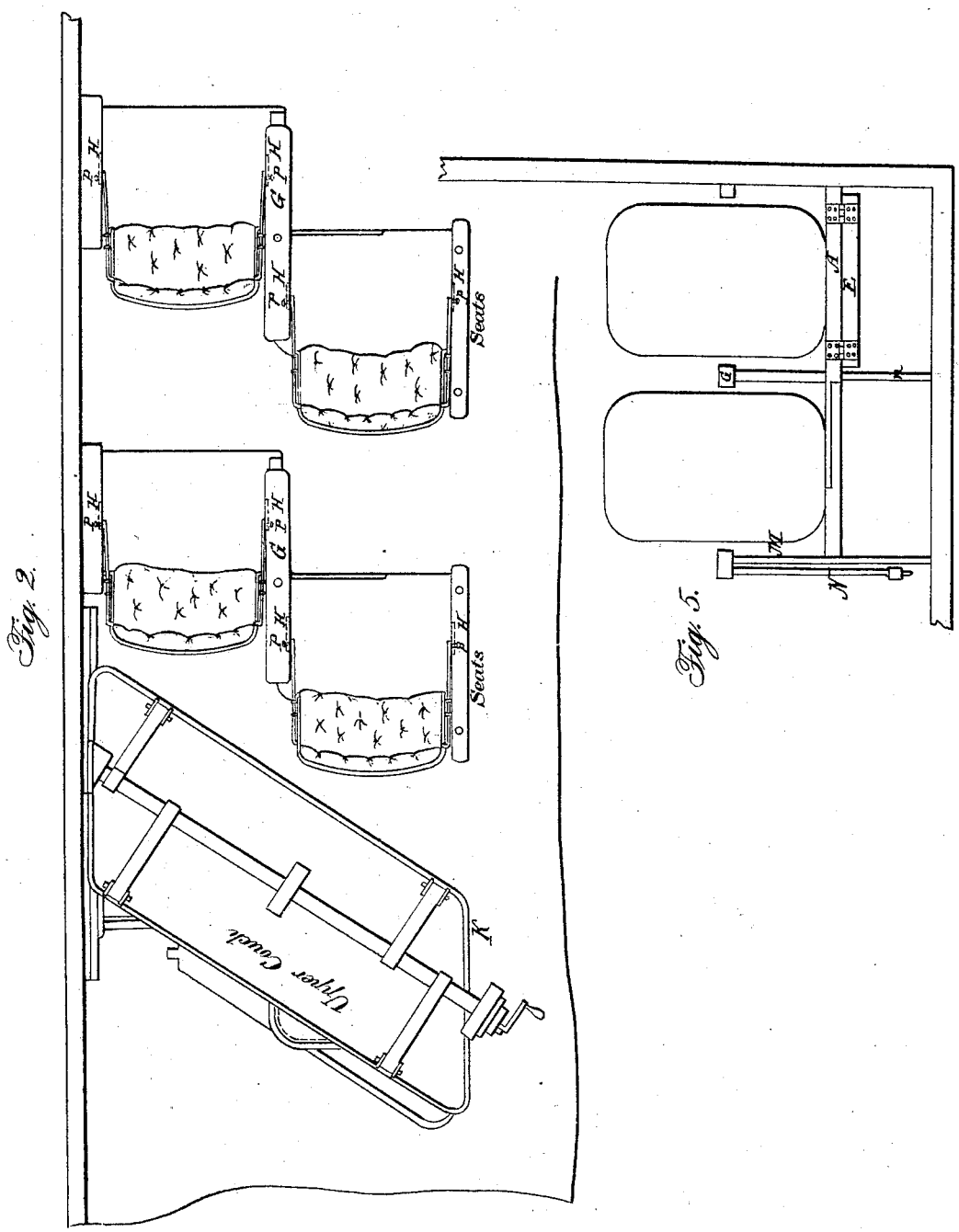

UNITED STATES PATENT OFFICE.

HORATIO ALLEN, OF NEW YORK, N. Y.

IMPROVED SEAT AND COUCH FOR RAILROAD-CARS.

Specification forming part of Letters Patent No. 55,448, dated June 12, 1866.

*To all whom it may concern:*

Be it known that I, HORATIO ALLEN, of New York, in the county and State of New York, have invented Improvements in Passenger Accommodation in Railroad-Cars, of which the following is a specification.

Assuming that the American arrangement of passenger-cars by use of seats in pairs on each side of a central passage is preferable to any other arrangement, it is believed that improvements thereon can be made which will provide more fully for the comfort and agreeable accommodations of passengers, especially for the long travel which takes place in the United States.

I propose to effect improvements of this character—

First, by providing seats for the passengers which have the following advantages: First, each passenger has a separate seat, and has room for elbows and knees without coming in contact with the elbows and knees of other passengers; second, no passenger can take possession or part possession of more than one seat; third, while the seats of each pair of seats are so far separated as to meet the preferences of persons strangers to each other, they are in such proximity as to be pleasant for two passengers traveling together, but the two seats also admit of being so arranged as to form a sociable, which places the two passengers in the most agreeable relative position that seats can provide; fourth, a place and means are provided to receive and hold securely and conveniently a tray from which to take lunch; fifth, the central passage is made more convenient in use.

Second, by providing at all times, by proper adjustment of parts, accommodations for lying down, affording thereby a place of repose and rest by day and of sleeping by night.

The combinations and devices by which these two classes of advantages are obtained are described herein, and are illustrated by drawings hereto annexed.

To obtain the advantages referred to in the first class I place the pair of seats on each side of the central passage in such relation to each other and the length of car that a line from center of one seat to center of the other seat is diagonal to the length of the car. Figures 1 and 2 represent this combination.

A A' B B' C C' are pairs of seats. The lines $a\ a'\ b\ b'\ c\ c'$ are diagonal to the length of the car at such angle that the elbows of the two passengers, when seated, do not come in contact.

The frame and back of each seat may be similar to the frames and backs of the present double seat, the back being adjustable in like manner to riding in either direction; or each seat may have its permanent back and the seat turning on a center-pin, D, as shown in Fig. 1.

When one seat is faced in one direction and the other seat in the other direction, as shown in Fig. 1, the pair of seats will be of the combination called a "sociable" or "*tête-à-tête*" seat. On the arms or on one of the arms between the seats a place is provided to receive and hold by a pin a tray for lunch, &c.

To facilitate the passing of passengers in the central passage, I place the open space P between two seats on one side of the passage opposite the seats on the other side, as shown in Fig. 1.

To provide accommodation for lying down, I combine with two seats, A A', having the diagonal position described, four pieces, E E and F F, of the form represented, which pieces are connected with the frames of the seats or sides of the car by suitable hinges, allowing the pieces E E to have either a horizontal position level with the seat, as shown in Fig. 2, or to be folded away, as shown in Figs. 3 and 5, and the pieces F F to have either a horizontal position, as shown in Fig. 2, or to stand erect and to support central arm-piece to the two seats.

When the four pieces E E F F are adjusted to a horizontal position, in combination with the two seats A A', as shown in Fig. 2, a surface of a rhomboid form is obtained, the long side of the rhomboid being diagonal to the length of the car and the short side parallel to the side of the car, and the long diagonal of the rhomboid is of such length and the width of the rhomboid on the line $m\ n$ is such that adequate room for lying down at full length is provided. A suitable mattress being placed on this couch, a place where one of the two passengers can lie down is obtained.

When the two pieces F F, Figs. 2, 3, 5, are in a vertical position, a cap-piece, G, fitted onto the two, secures them in position. The forward part of this cap-piece is the support of the arm and elbow of one passenger, and the after part is the support for the arm and elbow of the other passenger. In this arm cap-piece G is the place to receive the tray or basin. This arm-piece at the center and the arm-pieces at the ends have the metal plates and sockets H, which receive the pins $p\ p$ of the radius-bars of the backs. The radius-bars admit of being detached when the backs are to be removed preparatory to forming a couch of the two seats and the pieces E E F F. The seats thus developed form a couch and provide a lying-down place for one passenger. I make provision for lying-down place for the other of the two passengers by letting down from above a couch-frame of rhomboid form, whose sides are parallel to the sides of the rhomboid couch formed from the seats. This upper couch-frame, K, may be supported either by suspension, as shown in Fig. 3, where the frame is suspended by the cords I I, or the frame may be supported by connection with side of car at one end and suspended at the other from ceiling, as shown in Fig. 4, in which the frame K is connected by a hook, S, to a staple in side of car, and is hung at the other by cord I I; or the end of the frame next central passage may be supported by legs L L, which are hinged to the frame and rest on and can be secured to the end piece, M, as shown in Fig. 3; or the end may be supported by pieces N, which are hinged to or connected with the end piece, M, and secured to the end of the frame when let down, as shown in Fig. 4; or the end of the frame may be supported by light posts O O, resting on the floor, as shown in Fig. 4.

When the couch K is not required it is secured to the ceiling immediately above its position when in use, and on this frame are placed the mattresses, pillows, &c., required for the two couches.

When the couches are to be used for sleeping-places at night, suitable curtains inclose the space occupied by two passengers, and the space provided between the couches lengthwise the car is used by the passenger in making such preparation for lying down as he chooses to make.

I claim as my invention and desire to secure by Letters Patent—

1. The combination, with the floor and sides of a railroad passenger-car, of couches of a rhomboidal form, placed diagonally to the length of the car, as herein described, and constructed of two seat-pieces, A A', two corner-pieces, E E', and two central pieces, F F', and supported by frames and legs, said couches being convertible into a pair of seats by putting out of the way the two corner-pieces E E' and securing in a vertical position the two center pieces, F F', by the cap-piece G, said pair of seats having a relative position diagonal to the length of the car, all substantially in the manner and for the purpose herein described.

2. The combination, with the seats herein described and sides of a railroad passenger-car, of upper couches of rhomboidal form placed diagonally to the length of the car, as herein described, and constructed of a frame supported as herein described, all substantially in the manner and for the purpose herein described.

HORATIO ALLEN.

Witnesses:
JOHN CANTINE,
ALB. LUCIUS.